Figure 1:
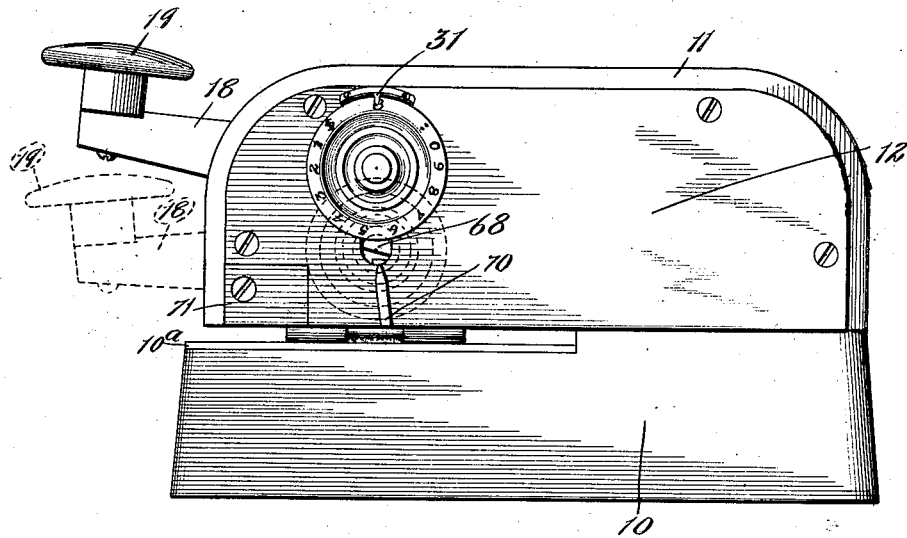

No. 878,021. PATENTED FEB. 4, 1908.
N. B. RICE.
CHECK PROTECTOR.
APPLICATION FILED JUNE 5, 1907.

3 SHEETS—SHEET 1.

Witnesses:
Inventor:
Nathaniel B. Rice

No. 878,021. PATENTED FEB. 4, 1908.
N. B. RICE.
CHECK PROTECTOR.
APPLICATION FILED JUNE 5, 1907.

3 SHEETS—SHEET 2.

Witnesses:

Inventor:
Nathaniel B. Rice
by
Bond, Adams, Pickard & Jackson
Attys

No. 878,021. PATENTED FEB. 4, 1908.
N. B. RICE.
CHECK PROTECTOR.
APPLICATION FILED JUNE 5, 1907.

3 SHEETS—SHEET 3.

Witnesses:
Ira D. Perry
U. P. Kilroy

Inventor:
Nathaniel B. Rice
by
Bond Adams Pickard & Jackson
Attys

UNITED STATES PATENT OFFICE.

NATHANIEL B. RICE, OF CHICAGO, ILLINOIS, ASSIGNOR OF ONE-HALF TO ALFRED D. PLAMONDON, OF CHICAGO, ILLINOIS.

CHECK-PROTECTOR.

No. 878,021.     Specification of Letters Patent.     Patented Feb. 4, 1908.

Application filed June 5, 1907. Serial No. 377,420.

*To all whom it may concern:*

Be it known that I, NATHANIEL B. RICE, a citizen of the United States, residing at Chicago, in the county of Cook and State of Illinois, have invented certain new and useful Improvements in Check-Protectors, of which the following is a specification, reference being had to the accompanying drawings.

My invention relates to check-punching machines, or what is generally known as "check protectors", and its general object is to provide a new and improved check-protector by means of which the characters indicating the amount of the check may be so impressed upon the check as to prevent any successful attempt to alter or "raise" the check.

To that end my invention consists, generally, in the providing of suitable manually-operated mechanism by means of which the surface of the check may be punctured or broken over an area somewhat greater than the area occupied by the figures indicating the amount of the check, and by means of which figures indicating the amount of the check may be impressed or printed upon the broken or punctured area previously broken; and to so construct this breaking or puncturing mechanism that the area of the surface of the check upon which the figures indicating the amount is subsequently printed may be so broken that while it remains sufficiently held together to receive the printed figures it will not permit rubbing for the purpose of erasure and changing the figures without such a destruction of the surface as would betray the attempt to alter or raise the check; and also in so puncturing this area that the ink of the impressed figures will show upon the reverse side of the punctured area.

It is a further object of my invention to provide new and improved mechanism for a check protector operated by the stamping lever which shall perforate and break the surface of the check upon the area to be printed upon from both sides; and to provide means by which the amount of this perforation may be adjusted so that with different character of paper in the check the broken area may be sufficiently broken to be destroyed in case any rubbing is applied to it for purposes of erasure but yet hold together sufficiently to receive the printed figures.

My invention also has for its object to improve the mechanism of check-protectors in sundry details hereinafter pointed out.

Figure 2:
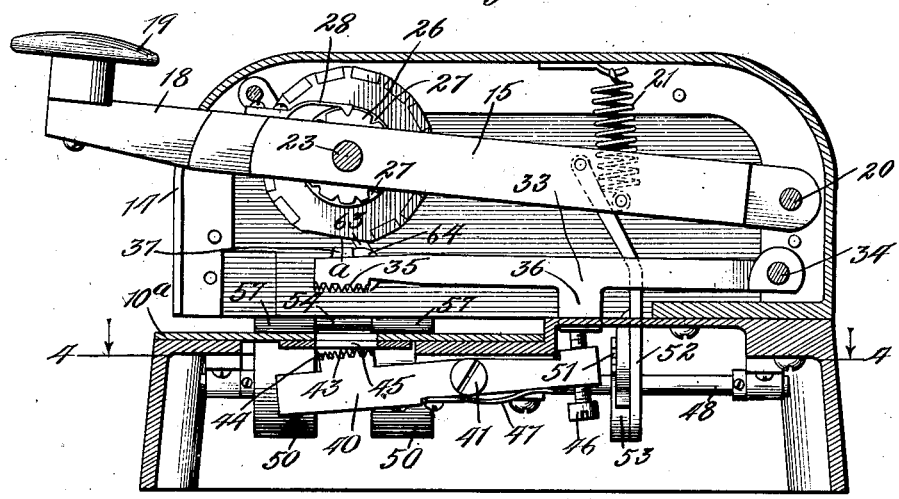
Figure 3:
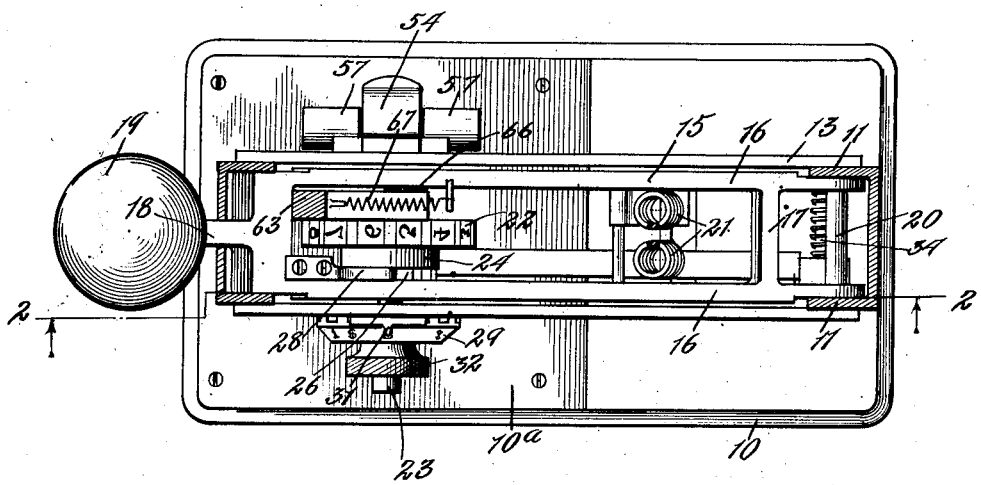
Figure 4:
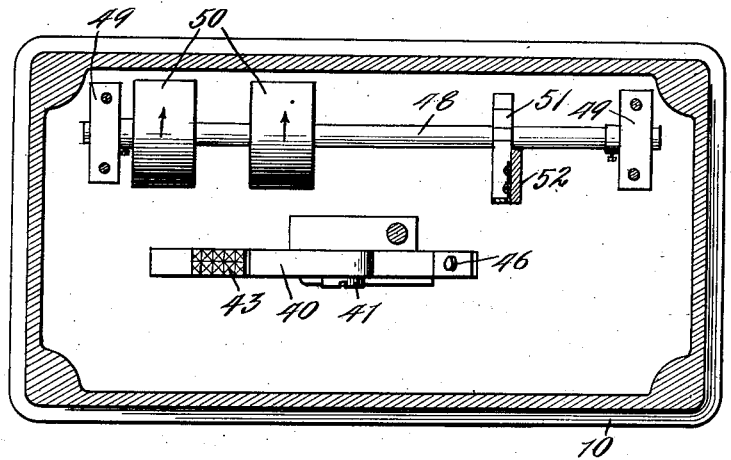
Figure 9:
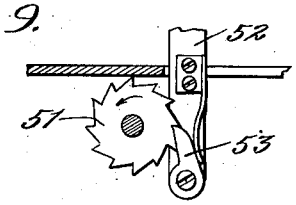
Figure 5:
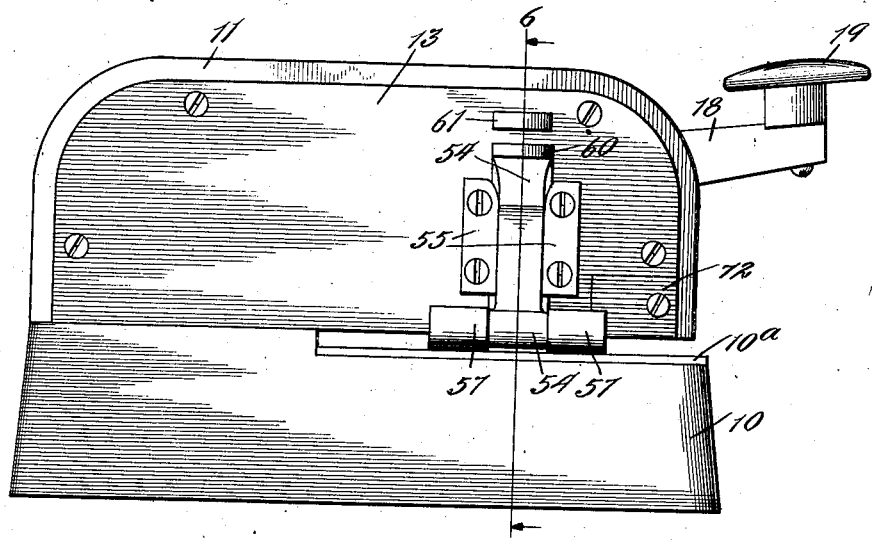
Figure 6:
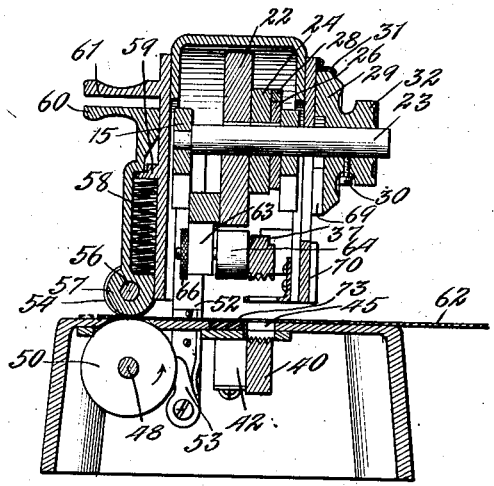
Figure 7:
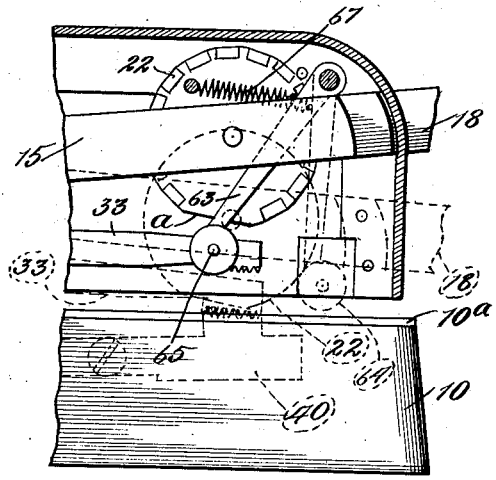
Figure 8:
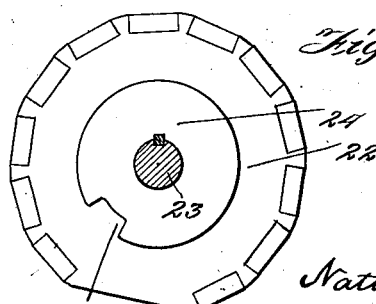

In the accompanying drawings—Figure 1 is a side elevation; Fig. 2 is a vertical section on line 2—2 of Fig. 3; Fig. 3 is a top or plan view with the top of the casing removed to show the operative parts; Fig. 4 is a horizontal section on line 4—4 of Fig. 2; Fig. 5 is a side elevation, being the opposite side from that shown in Fig. 1; Fig. 6 is a vertical cross-section on line 6—6 of Fig. 5; Fig. 7 is a detail, showing the front end of the device with a portion of the casing removed to show the mechanism in different positions; Fig. 8 is an enlarged detail, being a side elevation of the printing wheel; and Fig. 9 is an enlarged detail, being a view of the pawl and ratchet mechanism by which the check-advancing rollers are operated.

Referring to the drawings—10 indicates a base, which, as is best shown in Fig. 2, is hollow. The front portion of the base is not quite so deep as the rear portion, and is preferably open at the top and provided with a removable cover-plate 10ª which is secured thereto by screws, or in any other appropriate way. The top of the base is thus upon two different levels to provide an opening below the casing hereinafter described to admit the check which is to be punched and stamped.

11 indicates a casing, which is mounted on the base and provided with removable side-plates 12—13. The front portion of the casing is provided with a vertical slot 14, as is best shown in Fig. 2, to permit the movement of the operating-lever hereinafter described.

15 indicates an operating-lever, the main portion of which is in the form of a frame consisting of side-bars 16 and cross-bars 17, and is provided with a forward extension 18 which projects through the slot 14 in the casing 11 and is provided at its outer end with an operating handle 19. The lever 15 is pivoted by means of a short shaft 20, which is mounted at the rear to the casing 11. The lever is normally held in the positions shown in solid lines in the several figures by means of spiral springs 21, which are connected at one end to the top of the casing and at the other end to the lever 15.

22 indicates a polygonal wheel, which is keyed, or otherwise secured, to a pin 23 which is journaled in the side-bars 16 of the lever 15 toward the front end thereof. This polygonal wheel is provided with a number of faces of which all but one are of the same circumferential length. The remaining face is of twice the circumferential length of the others, as is best shown in Fig. 8. This wider face is indicated by *a* in Fig. 8. Into each of the other faces is let a type-block whose outer surface bears a type figure. These type figures, arranged in the order shown in Fig. 8, are as follows: $ 1 2 3 4 5 6 7 8 9 0. The wider space *a* is cut straight across so as to recede from the circular line of the circumference, as is shown in Fig. 8.

24 indicates a wheel of smaller diameter than the type-wheel 22, which is keyed, or otherwise secured, to the pin 23, or may be formed integral with the type-wheel 22. This wheel 24 is mounted upon the right-hand side—facing the front of the machine—of the wheel 22. That is to say, the machine being adapted to move the check to be punched from left to right, the wheel 24 is upon the opposite side of the type-wheel from the direction of movement of the check. The wheel 24 is provided with a recess 25 opposite the face of the wheel, which contains the type-printing stars.

26 indicates a wheel keyed upon the pin 23 upon the right of the wheel 24 and snugly adjacent thereto. The wheel 26 is provided with a number of notches 27, which are engaged by a spring-latch 28 mounted upon the lever 15. The latch 28 operates to engage the notches 27 and hold the pin 23 at any desired position when turned by the devices hereinafter described.

29 indicates an indicator-wheel, which is secured to the pin 23 by means of a set-screw 30 exterior to and flush against the side of the casing. The indicator-wheel 29 is provided upon its surface, as is best shown in Fig. 1, with a series of characters corresponding with the characters upon the type face of the type-wheel, and with a character (as B) corresponding with the cut-away portion *a* of the type-wheel. These figures or characters are preferably placed upon the indicator-wheel so as to be diametrically opposite the corresponding character or space on the type-wheel 22, so that when the pin 23 is turned to bring any desired number under a pointer 31 mounted upon the side of the casing 11 above the wheel the spring-latch 28 may be dropped into one of the notches 27 and the desired type or space *a* be brought into operative position to be used, as hereinafter described. The indicator-wheel 29 is turned by means of a thumb-wheel 32 preferably formed integral therewith. It will be seen that when the lever is rocked downward the type-wheel will be carried downward with the desired character to print upon the check or the space *a* brought into operative position for the purpose hereinafter described.

33 indicates a lever, the rear end of which is pivoted to a pin 34 mounted in the casing 11 below the operating-lever 15. The lever 33 is mounted in the casing below the operating-lever 15 and in such a position as to be cleared by the type-wheel 22 when the operating-lever is operated and to be in register with the wheel 24, as is best shown in Fig. 6. Preferably, a slight clearance should be provided between them to permit the free operation of the parts and particularly the inking-roller hereinafter described. The forward or free end of the lever 33 is provided upon its under surface with a number of perforating points 35.

36 indicates a stud, which is formed integral with the lever 33 and projects downward therefrom at a suitable point between the ends of the lever to operate the coacting perforating lever hereinafter described.

37 indicates a stud on the upper surface of the forward end of the lever 33, which is adapted, when the stars are placed in printing position, to enter the recess 25 so as to prevent the perforation of the paper when said stars, or similar device, are printed to indicate the end of the number printed upon the check as hereinafter described. When the operating-lever 15 is pressed downward, the periphery of the wheel 24 ultimately is brought into contact with the stud 37, and the lever 33 is rocked downward, except, as has been said, when the type-wheel is turned in such a position as to print stars or similar device. In this last case, as has been said, the stud 37 registering with the opening 25 the lever 33 is not pressed downward a sufficient amount to perforate the check.

40 indicates a lever, which is pivoted by a screw 41 at a point between its ends to a shoulder or bar 42 which is screwed, or otherwise secured, upon the under surface of the top portion of the base. Near its outer end the lever 40 carries upon its upper surface an upwardly-projecting portion 43 which registers with the perforating points 35 on the lever 33, and which is provided upon its upper surface with a number of perforating points 44. The projection 43 with its points 44, when the lever 40 is operated, as hereinafter described, moves upwards through a suitable opening 45 in the top of the base 10 in order to meet and coact with the points upon the lever 33. The points 35 and 43 are so placed that they come between one another when operated,—that is to say, so that the projections of one come between the points of the other.

46 indicates a set-screw, which is carried by the other end of the lever 40, and which bears against the stud 36 on the under surface of the lever 33.

47 indicates a flat spring, one end of which is screwed, or otherwise secured, to the shoulder or bar 42, and the other end of which bears upon the under surface of the lever 40 and operates to normally hold the levers 33 and 40 in the position shown in Fig. 2. By means of the set-screw 46 the levers may be so adjusted with relation to each other that the proper degree of interaction between the points 35—44 may be secured to suitably perforate and break the paper, as hereinafter described. The lever 40 is, of course, as is best shown in Fig. 6, immediately below and in registry with the lever 33. When the lever 33 is pressed downward by the engagement of the stud 37 with the periphery of the wheel 24 during the movement of the operating-lever, the stud 36 bears upon the upper end of the set-screw 46 and the lever 40 is thereby rocked, moving the front end upward so that the points 44 passing upward through the opening 45 meet and coöperate with the points 35 upon the lever 33 to punch a rectangular area upon the surface of the check. The thickness of the levers 33—40 is preferably the same as the thickness of the type-wheel 22, and the area covered by the perforating points of the two levers is such as to be at least as wide as the printed figure and somewhat longer.

48 indicates a shaft, which is journaled in suitable bearings 49 on the under surface of the top of the base to the left of and outside of the left-hand side of the casing.

50—50 indicate rollers, which are keyed upon the shaft 48 and are of a diameter sufficient to project through suitable openings in the top-plate 10ª. These rollers are preferably formed of rubber, or other suitable material, adapted to engage a strip of paper and by their rotation with the aid of the coöperating devices hereinafter described advance the same. These rollers are in register with the printing and perforating devices hereinbefore described.

51 indicates a ratchet-wheel, which is keyed, or otherwise secured, upon the shaft 48.

52 indicates a link, which is pivotally connected at its upper end with the lever 15 and carries upon its lower end a spring-actuated pawl 53 adapted to engage the teeth of the ratchet-wheel 51. When the operating-lever is moved forward for the purpose of printing or perforating the check, the pawl 53 slips over the ratchet-teeth. When the lever returns to its normal position, the spring-pawl 53 engaging the ratchet-wheel 51 turns it in the direction indicated by the arrows on the several figures, rotating the rollers 50 in the direction indicated by the arrows. The parts are so proportioned that the amount of rotation given to the rollers 50 will be sufficient to advance the check being punched a distance equal to the width of the type-wheel and perforating levers.

54 indicates a slide-bar, which is mounted in bearings 55 upon the left-hand side of the side-plate 13 of the casing 11. The slide-bar 54 carries journaled on a pin 56 on its lower end two rollers 57, which are preferably formed of rubber, or other suitable material, adapted to engage a sheet of paper, and which coöperate with the rollers 50 to advance the sheet.

58 indicates a spiral spring, which is mounted in a suitable recess in the slide-bar 54,— the upper end bearing upon a lug 59 on the side of the casing and the lower end upon the bottom of the recess and operating to normally hold the rollers 57 yieldingly against the surface of the rollers 50.

60 indicates a thumb-piece formed upon the upper end of the slide-bar 54.

61 indicates a thumb-piece mounted upon the side of the casing 11 above the thumb-piece 60. By gripping the two thumb-pieces 60 and 61 between the fingers, the slide-bar 54 may be raised to permit the insertion of the check between the rollers. Referring to Fig. 6, 62 indicates a check, which is placed upon the machine on the plate 10ª showing its forward end engaged by the rollers.

Referring to Fig. 7, where these parts are best shown, 63 indicates a swinging lever, which is pivoted at its upper end near the top of the base 10 in front of the type-wheel. The lower end of the swinging lever 63 carries an inking-wheel 64, which is journaled upon a pin 65 mounted on the lower end of the lever 63. The pin 65 is screw-threaded so as to screw into a suitable screw-threaded opening in the lever 63, and is provided with a suitable head by which it may be screwed into and out of position. 66 indicates a jam-nut, which is screwed upon the outer end of the pin 65. The inking-wheel 64 is so carried by the lever 63 that it comes below and registers with the periphery of the type-wheel 22. The inking-wheel 64 is, of course, provided with an ink-absorbent material upon its surface so that it may hold a supply of ink for the inking purposes hereinafter described. 67 indicates a spiral spring, one end of which is connected with the casing and the other with the lever 63 and operating to hold the lever 63 normally in the position shown in Figs. 6 and 7 and return the same to that position after being forced out of it, as hereinafter described. When the operating-lever 15 is lowered the periphery of the type-wheel 22 comes in contact with the inking-wheel 64, and as the downward movement continues, the lever 63 is swung forwrad into the position shown in dotted lines in Fig. 7,— the inking-wheel carrying ink, as has been described, moving upon the surface of the type and inking the same with each operation. In order to permit the downward motion of the pin 23 for the operation of the lever 15, the side of the casing 12 through which it passes is provided with a slot 68 which is arc shaped on a radius equal to the distance between the pivotal point 20 of the operating-lever 15 and the pin 23. Between each of the figures on the indicator-wheel 29 a radial slot 69 enters said wheel, one of which slots, according to the position of the printing devices, is engaged by a shoulder 70 on the outer surface of the plate 12 immediately below the registering-wheel, operating to hold the printing devices in position during the operation of the machine. The shoulder 70 is grooved in the arc of a circle whose center is the pivotal point 20 of the lever 15, in order to properly register with the grooves 29 and engage them during the descent of the operating mechanism. 71—72 indicate removable plates upon the side-plates 12—13 secured thereto by screws. By the removal of the plates 71—72 access may be had to the jam-nut 66 on the head of the screw 65, in order that the inking roller 64 may be removed and a new and freshly-inked roller substituted whenever may be desired. 73 indicates a platen, which is let into the top plate of the base so as to register with the type character on the wheel 22 when the lever is operated to print the character. This platen 73 is formed of rubber, or some suitable slightly-yielding material, to coöperate with the type upon the wheel in printing the paper,—the printing being done upon the paper between the pad and the type character.

The operation of the device is as follows: The check or strip of paper to be operated upon is inserted in position, as shown in Fig. 6, with its lead end engaged between the rollers 50 and 57. The indicator-wheel 29 is then set so that the blank space $a$ of the type-wheel 22 is lowermost, which is indicated by the pointer 31 coming over the marking on the indicator-wheel which indicates the proper position,—in this case by B. The operating-lever is then depressed, causing the wheel 24 to come in contact with the stud 37 on the lever 33, by which means the two levers 33—40 are brought together, the points 35 and 44 impressing the paper between them and puncturing it from both directions over an area covered by the points. These points are so formed as to puncture the paper in such a way as to break the fibers over the given area,—which, as has been said, is somewhat larger than the figure or character thereafter to be impressed upon it,—in such a way that while it is capable of receiving the impress of the character afterwards printed it will be so broken that it cannot be rubbed for the purpose of trying to erase the figure without practically destroying the paper. The operating-lever is then raised, whereupon by the operation of the spring-dog 53 the shaft 48 and rollers 50 are rotated sufficiently to move the check or strip of paper forward a distance equal to the width of the perforated or broken area. Because of the clearance between the type-wheel and the lever 37, which is made for the purposes above described, it will be necessary to again depress the operating-lever to puncture the paper a second time, which punctured area will come against the rear edge of the area which was previously punctured. The lever being raised, the strip of paper is again advanced by the rollers the width of the perforated area. The indicator-wheel being then set to the dollar sign, the lever is again depressed and the figure on the type-wheel which impresses the dollar sign being inked by the swinging over of the inking-roller, as above described, the dollar sign is printed upon the check upon the area which has just been perforated and broken. By reason of the previous perforation the ink is not only printed upon the face of the paper but passing through the broken perforated portion will appear to a considerable extent upon the reverse side of the check. At the same time and by the same operation of the lever the punching or breaking levers are operated and again break an area of the paper behind the printed character and immediately adjacent to the rear edge of the portion previously perforated. The indicator-wheel is then set successively to such figures as indicate the amount of the check, and each figure being printed upon the previously broken and punctured portion, and at the same time the breaking levers operating to punch or break another area immediately behind.

As soon as the figures indicating the amount of the check are completed, the indicator-wheel is set to the sign indicating the character to be printed immediately after the last figure, which, as illustrated in the drawings, consist of double stars, one above the other, although, of course, it may be any other suitable character. When the indicator-wheel is set to indicate the printing of this figure, the recess 25 comes in such position that when the lever is depressed the lug 37 on the lever 33 enters the recess 25, which prevents the two punching levers from being moved close enough together to punch the check,—the terminating character being printed upon the previously broken or punctured area. When the operation is completed, the surface of the check will have been perforated and broken over a rectangular area somewhat larger than the characters, and the figures indicating the dollar sign, the amount of the check and the terminating character will all have been printed upon this broken area. As has been said above, the printing of the characters upon the area previously broken causes the ink to pass through the broken or perforated surface so that the figures not only appear printed upon the surface of the check but also are shown in reverse on the other side. This is one of the great advantages of my device, because if any attempt were made to alter the check by rubbing upon the figures to erase them the rubbing would have to be applied to both surfaces of the check, which would insure such a complete breaking away of the already punctured or broken area as to show at once that the figures had been tampered with. I prefer also to use indelible ink for the printing of the figures. As has been said, one characteristic feature of the puncturing of that portion of the check surface upon which the figures are to be printed is the puncturing or breaking it in such a way that the surface will hold together sufficiently to receive the figures imprinted upon it but will be so broken that if any attempt is made to tamper with the figures by erasing them in any way the broken surface will be torn away and destroyed, immediately betraying any attempt to alter the check. In order that this breaking of the surface may be sufficient to prevent any rubbing upon it afterwards for the purpose of erasing the figure, and yet not be such as to itself tear away the paper, I have provided the adjusting-screw 46. By the adjustment of this screw, the two opposing puncturing portions of the levers—the points of which, as has been said, do not register with each other but are so constructed that the points of each enter between the spaces of the other—may be brought into such relation with each other as to effect this desired result in accordance with the character of the paper to be used. The tougher the character of the paper the more closely together should the two opposing breaking portions be brought to one another in order to sufficiently break without destroying the surface of the check. It will be understood, of course, that when it is desired to introduce the check the rollers 57 are lifted by the bringing together of the two thumb pieces 60—61 to permit the check being placed under the rollers. When the check is in position, the thumb screws are released and the spring brings the rollers into operative relation with the rollers 50. When the punching is completed, the rollers are again lifted by manual operation and the check removed.

That which I claim as my invention, and desire to secure by Letters Patent, is,—

1. In a check-protector, the combination with mechanism for advancing a strip of paper, of means for breaking the surface of the paper from both sides, and means for impressing a character upon the previously broken portion of said strip.

2. In a check-protector, the combination with means for advancing a strip of paper, of means for giving to said strip of paper a plurality of perforations to break the surface of the same from both sides over a given area, and means for printing a character upon the previously broken area.

3. In a check-protector, the combination with a base, an operating-lever mounted thereon, and means operated by said lever to advance said strip of paper, of means operated by said lever to puncture and break the surface of said paper from both sides over a determined area, and means operated by said lever to print a character upon the previously broken area.

4. In a check-protector, the combination with a base, an operating-lever supported thereon, of means operated by said lever adapted to give to said paper a number of perforations from both sides in order to break the surface over a given area, mechanism operated by said lever adapted to print a character upon the previously broken surface, and means operated by said lever to advance the strip of paper a given distance after each puncturing and printing operation.

5. The combination with a base and an operating lever mounted on said base, of means carried by said base and operated by said lever to break the surface of a strip of paper from both sides over a given portion of its area, mechanism operated by said lever to print a character upon the previously broken surface of said strip of paper, and mechanism operated by said lever to intermittently advance the strip of paper after each breaking and printing operation.

6. The combination with a base, an operating-lever mounted thereon, and means for holding a strip of paper on said base in operative relation to said lever, of opposing puncturing mechanism operated by said lever to puncture and break the surface of the strip of paper from both sides, a typewheel carried by said lever and adapted by the operation of said lever to print a character upon the previously broken area, and means operated by said lever to advance the strip of paper a predetermined distance after each breaking and printing operation.

7. In a check-protector, the combination with a base, an operating-lever mounted thereon, means for holding a strip of paper upon said base in operative relation to said lever, and means adapted to advance said strip of paper a predetermined distance after each impressing movement of the lever, of opposing levers provided upon their operative ends with a plurality of perforating points adapted to puncture and break the surface of the paper over a given area from both sides of the paper, printing devices operated by said operating-lever to print a character upon the previously broken area of the strip of paper, and means carried by said operating-lever for operating said perforating levers and said printing devices either simultaneously or separately.

8. In a check-protector, the combination with a base, an operating-lever mounted thereon, means for holding a strip of paper upon said base in operative relation to said lever, and means adapted to advance said strip of paper a predetermined distance after each impressing movement of the lever, of opposing levers provided upon their operative ends with a plurality of perforating points adapted to puncture and break the surface of the paper over a given area from both sides of the paper, printing devices operated by said operating-lever to print a character upon the previously broken area of the strip of paper, means carried by said operating-lever for operating said perforating levers and said printing devices either simultaneously or separately, and an adjusting screw mounted on one of said opposing levers and bearing upon the other whereby the breaking mechanisms may be adjusted to one another.

NATHANIEL B. RICE.

Witnesses:
C. E. PICKARD,
WILLIAM H. DEBUSK.